(12) United States Patent
Conley et al.

(10) Patent No.: US 11,859,762 B2
(45) Date of Patent: Jan. 2, 2024

(54) RECIPROCATING PUMP WITH INTERNAL VENTING

(71) Applicant: Lincoln Industrial Corporation, St. Louis, MO (US)

(72) Inventors: Paul G. Conley, St. Charles, MO (US); Keegan Sims, Belleville, IL (US)

(73) Assignee: LINCOLN INDUSTRIAL CORPORATION, St. Louis, MO (US)

( * ) Notice: Subject to any disclaimer, the term of this patent is extended or adjusted under 35 U.S.C. 154(b) by 651 days.

(21) Appl. No.: 17/007,093

(22) Filed: Aug. 31, 2020

(65) Prior Publication Data
US 2022/0065396 A1 Mar. 3, 2022

(51) Int. Cl.
| | |
|---|---|
| F16N 13/06 | (2006.01) |
| F16N 13/16 | (2006.01) |
| F16N 7/38 | (2006.01) |
| F16N 19/00 | (2006.01) |
| F04B 15/02 | (2006.01) |
| F04B 53/16 | (2006.01) |

(52) U.S. Cl.
CPC ............ *F16N 13/06* (2013.01); *F04B 15/02* (2013.01); *F04B 53/16* (2013.01); *F16N 7/38* (2013.01); *F16N 13/16* (2013.01); *F16N 19/00* (2013.01); *F16N 2013/063* (2013.01); *F16N 2280/00* (2013.01)

(58) Field of Classification Search
CPC . F16N 13/06; F16N 7/38; F16N 13/16; F16N 19/00; F16N 2280/00; B67D 7/645
See application file for complete search history.

(56) References Cited

U.S. PATENT DOCUMENTS

| | | | | |
|---|---|---|---|---|
| 6,260,664 B1* | 7/2001 | Fieffer | ................... | F16K 3/24 |
| | | | | 184/45.1 |
| 7,313,956 B1* | 1/2008 | Murphy, Sr. | ............ | F16N 29/04 |
| | | | | 73/313 |
| 9,341,173 B2* | 5/2016 | Laughlin | ............... | F04B 53/126 |
| 11,149,792 B2* | 10/2021 | Kreutzkaemper | .. | F16C 33/4647 |

(Continued)

OTHER PUBLICATIONS

"Dyna-StarTM HP and Dyna-Star HF—Electric Lubrication Pumps", Graco catalog, Mar. 2016; @2013-2016 Graco BVBA 341046ENEU Rev. D 03/16 Printed in Europe.

*Primary Examiner* — Michael R Mansen
*Assistant Examiner* — Mark K Buse
(74) *Attorney, Agent, or Firm* — J-TEK LAW PLLC; Scott T. Wakeman; Mark A. Ussai

(57) ABSTRACT

A lubricant pump includes a housing mountable to the upper end of a lubricant container and having a vertical central bore, an outlet passage extending between the central bore and an outlet port fluidly connectable with the lubricant distributor and a vent chamber having an inlet and an outlet. A vent inlet passage extends between the central bore and the vent chamber inlet and a vent outlet passage extends between the vent chamber outlet and a vent outlet port fluidly connectable with a container cavity. A movable valve element is disposed within the vent chamber and displaceable along an axis between a position in which the valve element obstructs the chamber inlet and/or the chamber outlet and a second position in which the chamber inlet is fluidly connected with the chamber outlet to provide an internal flow path from the central bore to the vent outlet port.

19 Claims, 13 Drawing Sheets

(56) References Cited

U.S. PATENT DOCUMENTS

| | | | |
|---|---|---|---|
| 2009/0057063 A1* | 3/2009 | Marek | F16N 29/00 |
| | | | 184/7.4 |
| 2009/0078507 A1* | 3/2009 | Gaugush | F16N 7/38 |
| | | | 184/6.4 |
| 2016/0169448 A1* | 6/2016 | Holman | F04B 19/22 |
| | | | 184/6 |
| 2016/0290848 A1* | 10/2016 | Conley | F16N 31/00 |
| 2017/0114957 A1* | 4/2017 | Conley | F16N 29/02 |

* cited by examiner

RECIPROCATING PUMP WITH INTERNAL VENTING

BACKGROUND OF THE INVENTION

The present invention relates to pumps, and more particularly to pumps for driving lubricating fluids such as grease.

Pumps for pumping or driving lubricants into delivery systems are generally known. When used for delivering grease from a reservoir to a lubricant delivery system, such pumps often include a housing mounted on top of the reservoir and an elongated pumping element extending from the housing and into the reservoir. In such pump constructions, an actuator drives the pumping element to reciprocate along a vertical axis to force grease upwardly into the housing and thereafter to the delivery system. When the delivery system includes injectors for metering precise amounts of lubricant, for example to one or more bearings, the grease in the delivery system must be returned to the reservoir or otherwise "vented" to relieve pressure within the injectors in order to enable the injectors to reset.

SUMMARY OF THE INVENTION

In one aspect, the present invention is a lubricant pump for driving lubricant from a container to at least one lubricant distributor, the container having upper and lower ends and an interior storage cavity for retaining a quantity of lubricant. The pump comprises a housing mountable to the upper end of the container and having a vertical central bore, an outlet passage extending between the central bore and an outlet port, which is fluidly connectable with the lubricant distributor, and a vent chamber having an inlet and an outlet. A vent inlet passage extends between the central bore and the vent chamber inlet and a vent outlet passage extends between the vent chamber outlet and a vent outlet port fluidly connectable with the container cavity. A movable valve element is disposed within the vent chamber and is displaceable along an axis between a first position, in which the valve element obstructs at least one of the chamber inlet and the chamber outlet, and a second position. In the valve element second position, the chamber inlet is fluidly connected with the chamber outlet to provide an internal flow path from the central bore to the vent outlet port.

In another aspect, the present invention is again a lubricant pump for driving lubricant from a container to at least one lubricant distributor, the container having upper and lower ends and an interior storage cavity for retaining a quantity of lubricant. The pump comprises a housing mountable to the upper end of the container and including a monobloc having a vertical central bore, an outlet passage extending between the central bore and an outlet port fluidly connectable with the lubricant distributor, and a vent chamber having an inlet and an outlet. A vent inlet passage extends between the central bore and the vent chamber inlet and a vent outlet passage extends between the vent chamber outlet and an outlet port fluidly connectable with the container cavity. An elongated, vertically-extending pumping element has upper and lower ends and is disposed within the housing central bore such that an annular flow channel is defined between the pumping element and the housing bore. The outlet passage and the vent inlet passage are each fluidly connected with the flow channel and the lower end of the pumping element is disposable within the container cavity. An actuator is connected with or disposed within the housing and configured to reciprocally linearly displace the pumping element along a vertical axis such that the pumping element drives lubricant from the container cavity and into the flow channel. Further, a movable valve element is disposed within the vent chamber and displaceable between a first position, in which the valve element obstructs at least one of the chamber inlet and the chamber outlet, and a second position. In the valve element second position, the chamber inlet is fluidly connected with the chamber outlet to provide an internal flow path from the flow channel to the vent outlet port.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
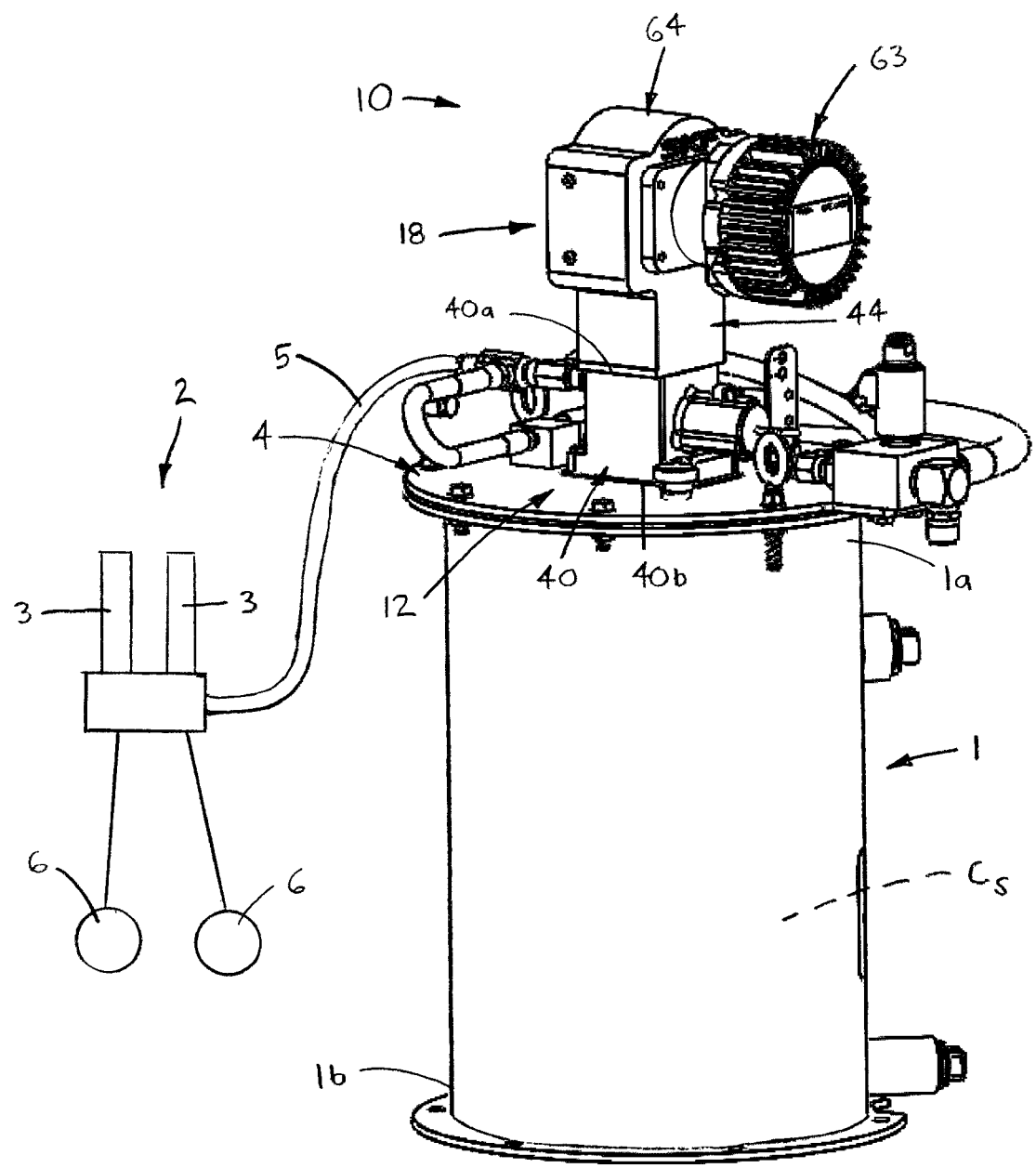
FIG. 1 is a perspective view of a lubricant pump having a housing with internal venting in accordance with the present invention, shown mounted on a lubricant container.

Certain terminology is used in the following description for convenience only and is not limiting. The words "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-18 a lubricant pump 10 for driving lubricant from a container 1 to at least one lubricant distributor 2 for delivering lubricant to one or more lubrication points 6, such as for example, bearings, gear faces, etc. The container 1 has upper and lower ends 1a, 1b and an interior storage cavity $C_S$ for retaining a quantity of lubricant and the lubricant distributor 2 preferably includes one or more injectors 3. The pump 10 basically comprises a housing 12 mountable to the upper end 1a of the container 1, a movable valve element 14 disposed within the housing 12, an elongated pumping element 16 and a pump actuator 18. The housing 12 has a vertically-extending, central bore 20, a lubricant outlet passage 22 extending between the central bore 20 and an outlet port 24 fluidly connectable with the lubricant distributor 2, and a vent chamber 26 having an inlet 28 and an outlet 30. A vent inlet passage 32 extends between the central bore 20 and the vent chamber inlet 28 and a vent outlet passage 34 extends between the vent chamber outlet 30 and a vent outlet port 36 fluidly connectable with the container cavity $C_S$.

Figure 6:
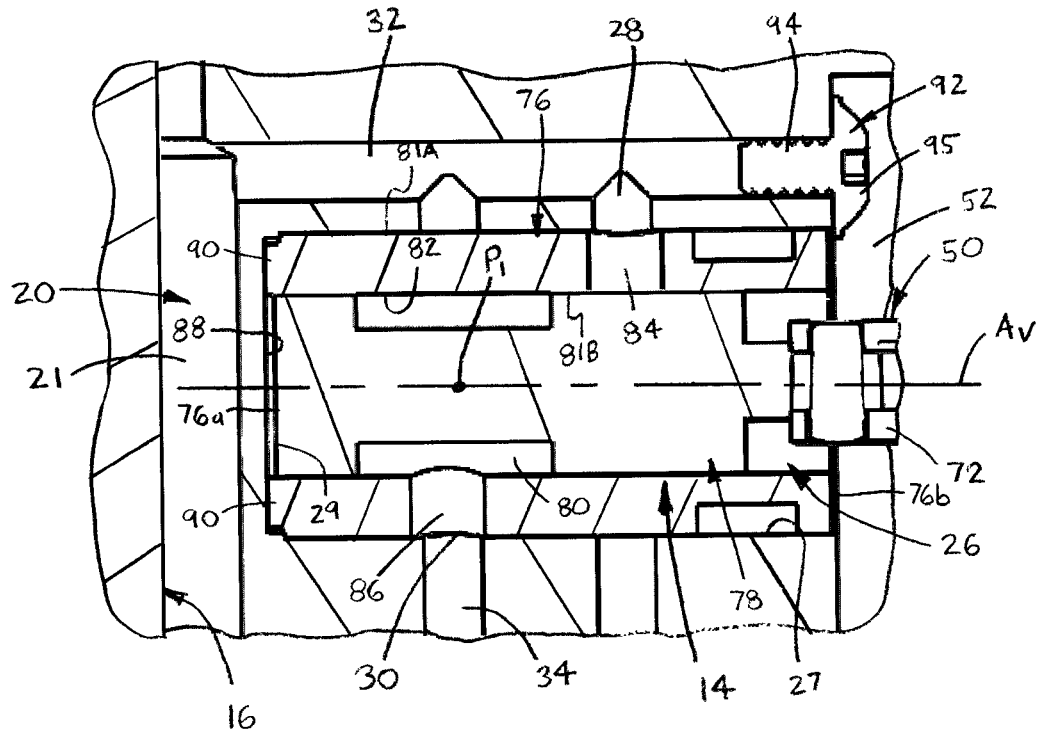
FIG. 6 is a broken-away, more enlarged view of a portion of the pump of FIG. 4, showing a valve element in a first, closed position.
Figure 7:
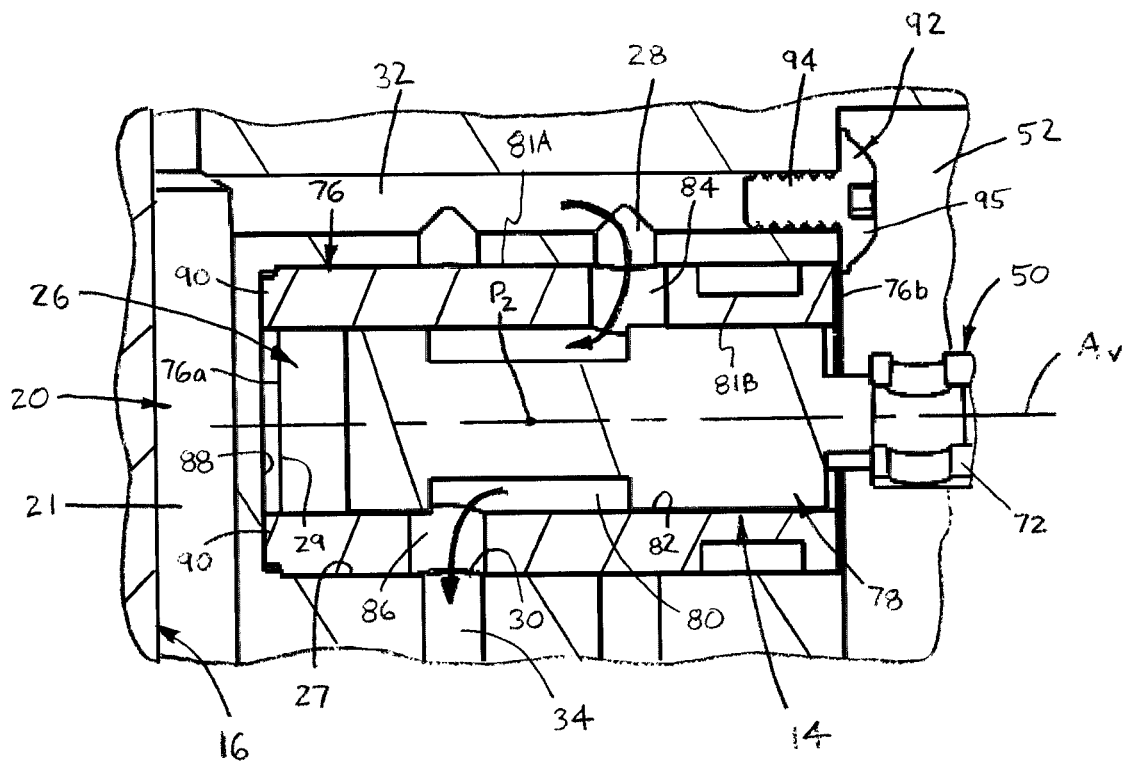
FIG. 7 is a broken-away, more enlarged view of the portion of the pump of FIG. 6, showing the valve element in a second, open position.
Figure 8:
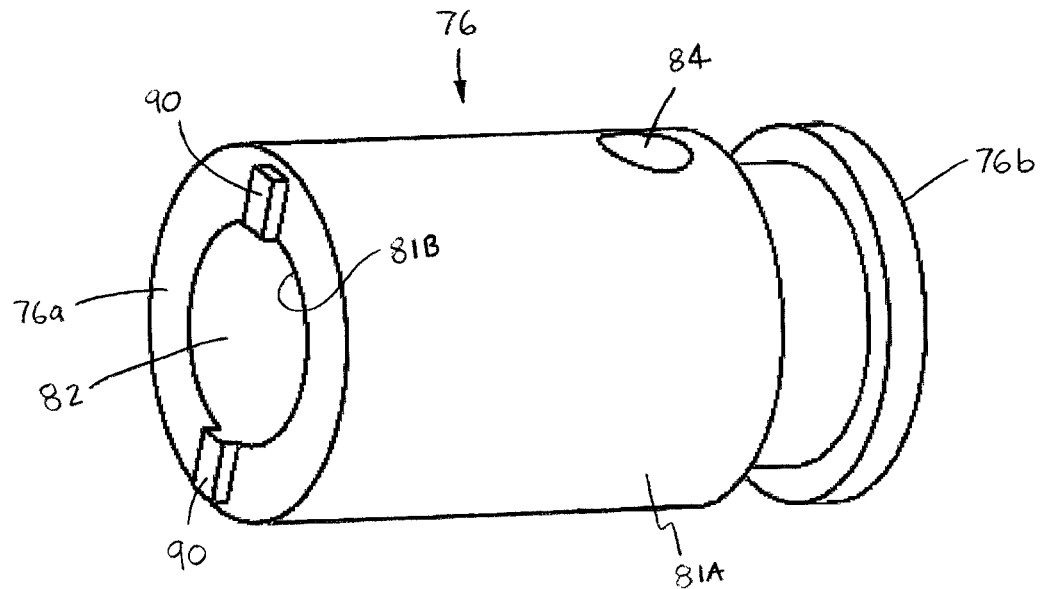
FIG. 8 is a perspective view of a sleeve of the first construction pump.
Figure 9:
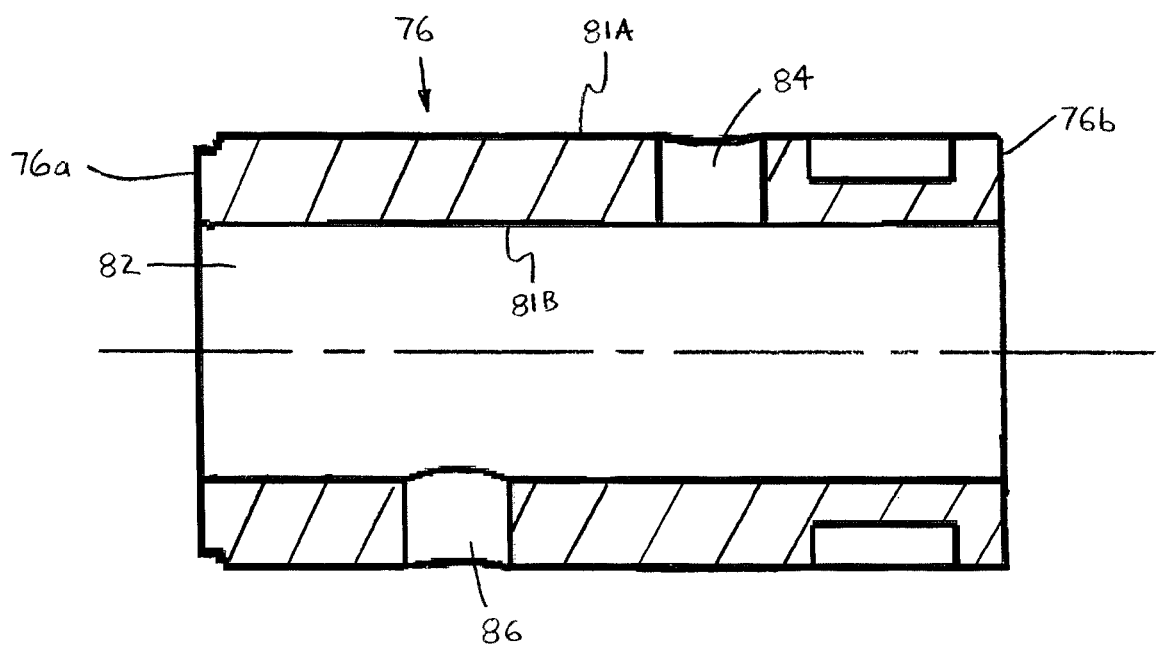
FIG. 9 is an axial cross-sectional view of the sleeve.
Figure 10:
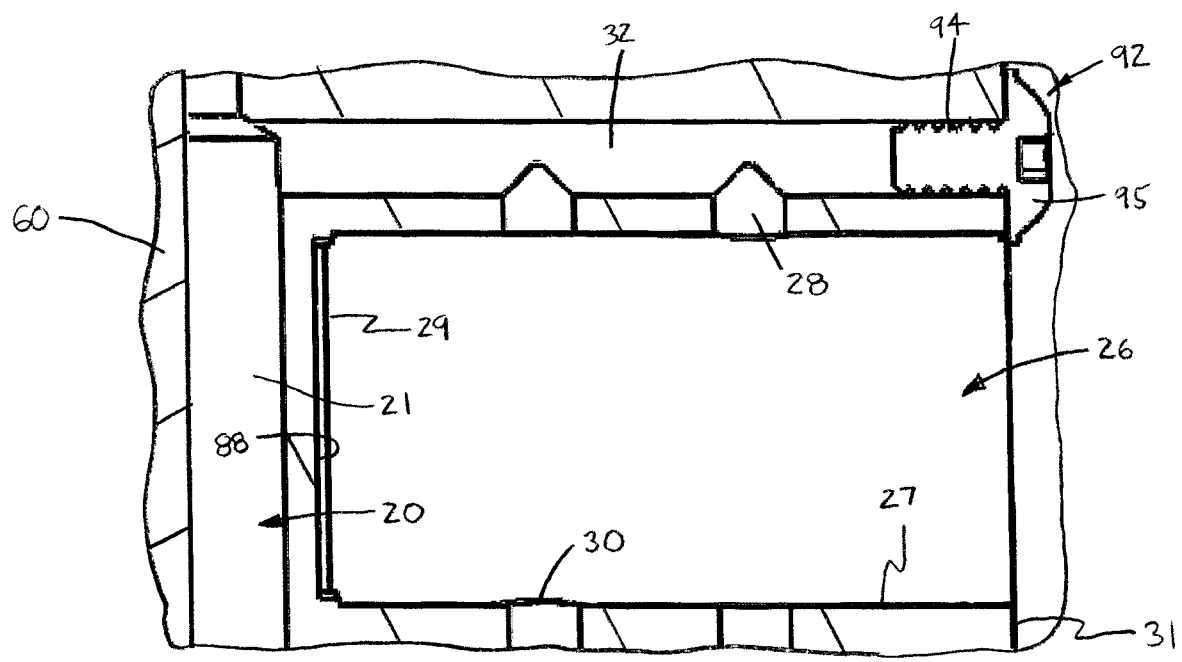
FIG. 10 is a broken-away, cross-sectional view of a portion of the pump of FIG. 4, showing a valve element chamber without the sleeve and the valve element.
Figure 11:
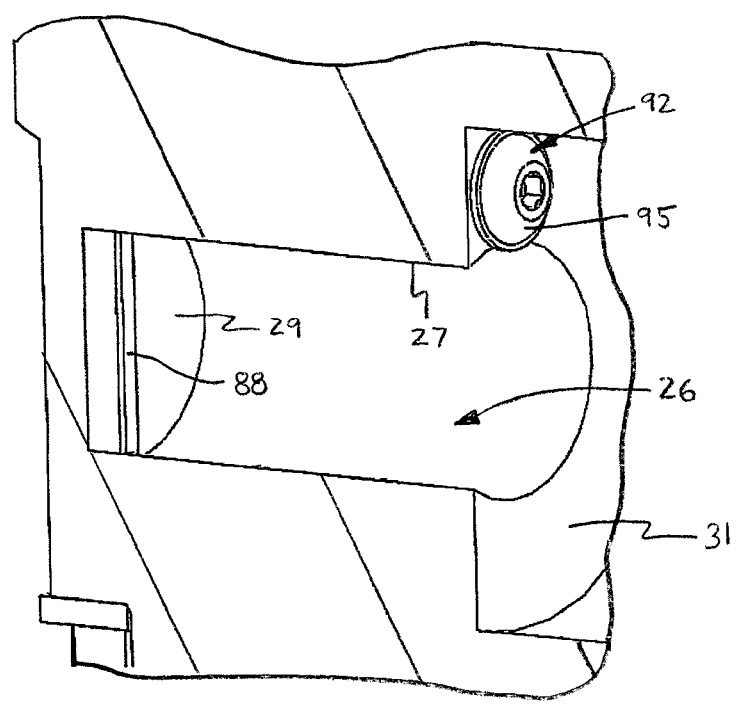
FIG. 11 is a broken-away, cross-sectional view of the valve element chamber in partial perspective.
Figure 16:
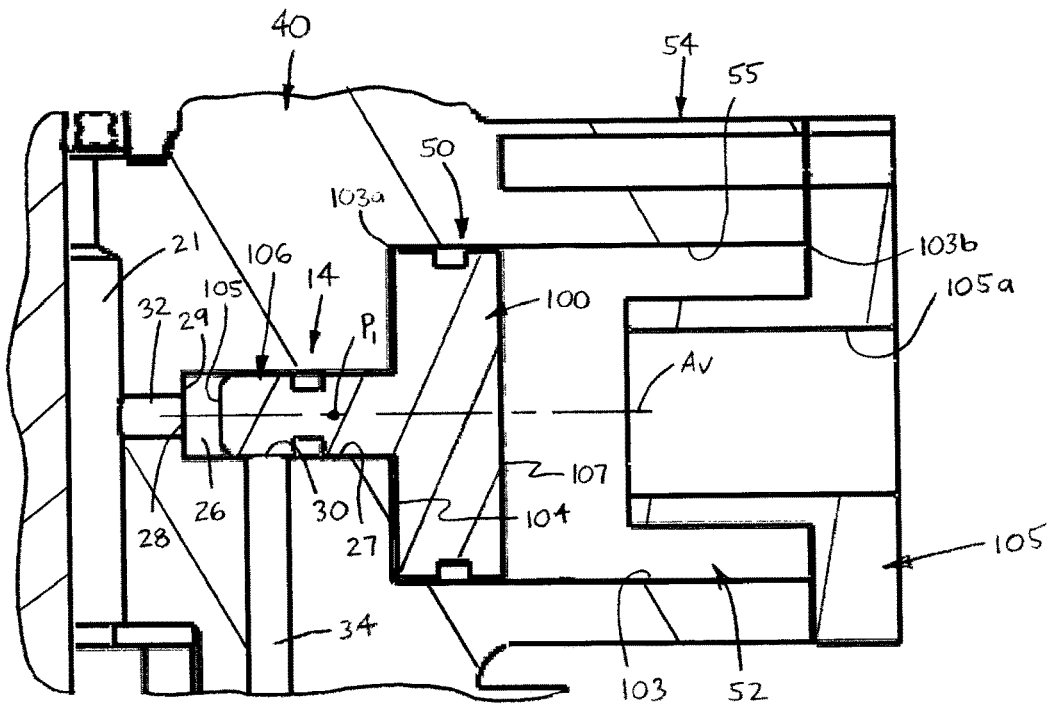
FIG. 16 is a broken-away, more enlarged view of a portion of the pump of FIG. 14, showing a valve element in a first, closed position.
Figure 17:
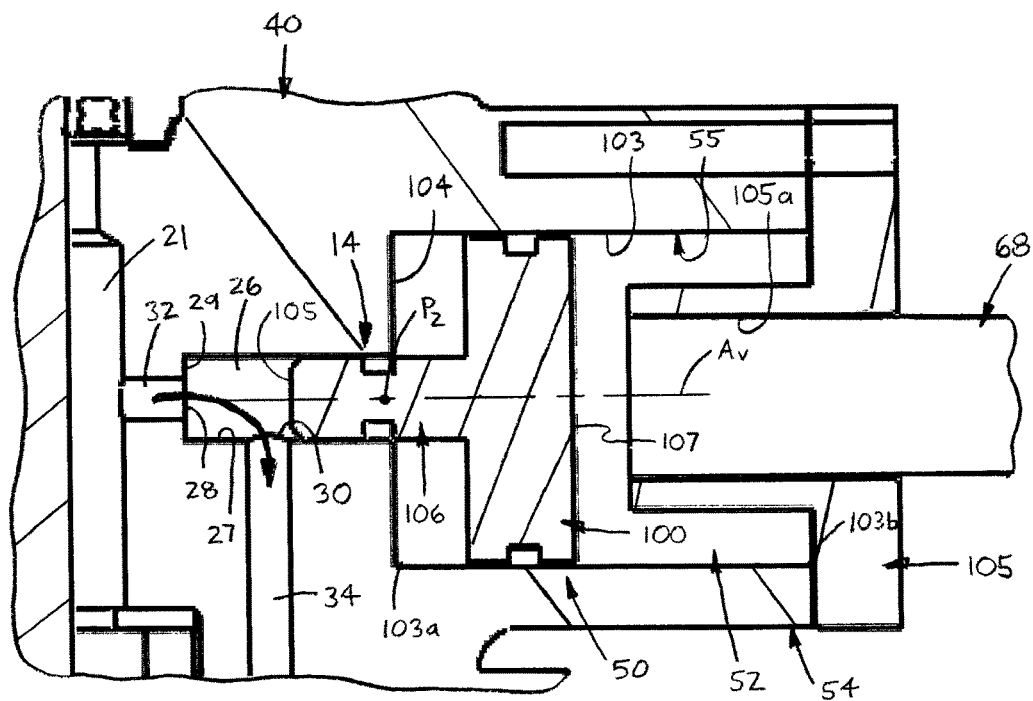
FIG. 17 is a broken-away, more enlarged view of the portion of the pump of FIG. 14, showing the valve element in a second, open position.

Further, the valve element 14 is disposed within the vent chamber 26 and is displaceable along an axis $A_V$ between first and second positions $P_1$, $P_2$, respectively, as indicated in FIGS. 6, 7, 16 and 17. In the first position $P_1$, the valve element 14 obstructs at least one of the chamber inlet 28 and the chamber outlet 30, preferably the inlet 28, as shown in FIGS. 6 and 16. In the second position $P_2$ of the valve element 14, the chamber inlet 28 is fluidly connected with the chamber outlet 30 to provide an internal flow path from the central bore 20 to the vent outlet port 36, as depicted in FIGS. 7 and 17. As such, lubricant within the housing 12 can be vented back into the container 1 to relieve or release lubricant pressure within the housing 12, and thereby within the distributor 2, to enable the injector(s) 3 to reset.

Figure 2:
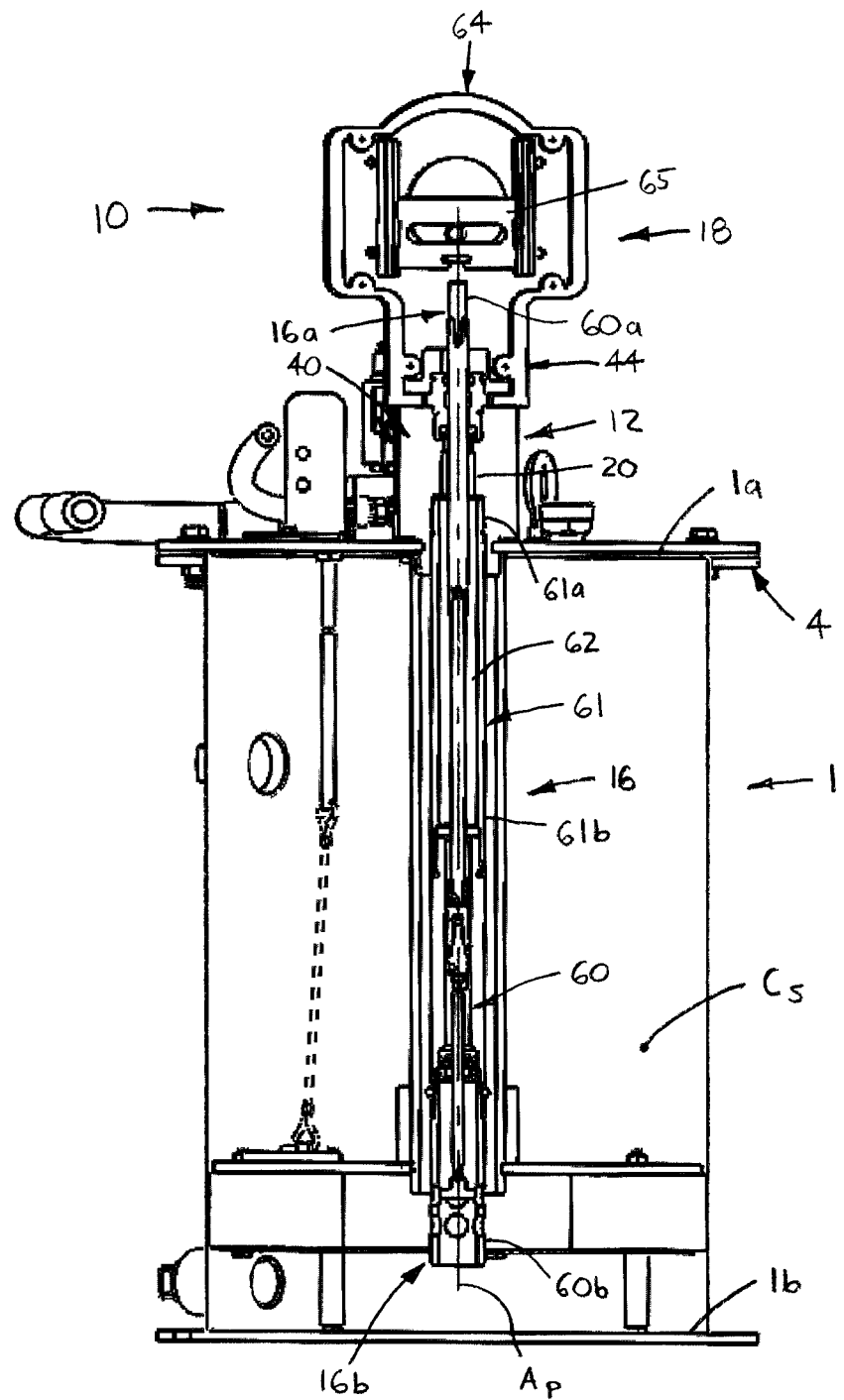
FIG. 2 is a cross-sectional view of the lubricant pump and container.

Furthermore, the elongated pumping element 16 is vertically-extending and has upper and lower ends 16a, 16b, the lower end 16b being disposeable within the container cavity $C_S$ and preferably within a quantity of lubricant disposed within the cavity $C_S$, as best shown in FIG. 2 The pumping element 16 is disposed within the central bore 20 such that an annular flow channel 21 is defined between the pumping element 16 and the central bore 20, the outlet passage 22 and the vent inlet passage 32 each being fluidly connected with the flow channel 21 so as to receive lubricant within channel 21, as discussed below. Also, the pump actuator 18 is connected with or disposed within the housing 12 and is configured to reciprocally linearly displace the pumping element 16 along a vertical axis $A_P$, and thereby within the quantity of lubricant. As such, the pumping element 16 drives lubricant from the container cavity $C_S$ and into the flow channel 21, and thereafter through the outlet passage 22 and outlet port 24 and into a delivery line 5 of the distributor 2, or alternatively through the vent inlet passage 32 to recirculate back to the container cavity $C_S$, as described below.

Preferably, the pump housing 12 includes a monobloc 40 providing the central bore 20, the outlet passage 22, the vent chamber 26, the vent inlet passage 32, and the vent outlet passage 34. As used herein, the term "monobloc" is intended to mean that the housing portion 40 is formed as a single piece or component, as opposed to an assembly of two or more pieces/components, for example formed as a casting, forging, etc. with appropriate machining to form the central bore 20 and the various passages and ports. More specifically, the monobloc 40 has upper and lower ends 40a, 40b and at least one and preferably a plurality of side surfaces 42. The lower end 40b is connectable with the container 1, preferably mountable onto a lid or cover 4 on the upper end 1a of the container 1, and the upper end 40a is configured to support an upper housing portion 44 for containing and supporting the pump actuator 18, as described below. Further, the central bore 20 extends between and through the monobloc upper and lower ends 40a, 40b, the outlet port 24 extends through one side surface 42 and the vent outlet port 36 extends through the monobloc lower end 40b. However, although the preferably including the monobloc 40 providing the lubricant outlet passage 22 and the internal vent chamber 26 and vent passages 32, 34, the housing 12 may alternatively be provided by an assembly of two or more components (structure not shown).

Further, the lubricant pump 10 preferably further comprises a valve actuator 50 configured to bias the valve element 14 toward the first position $P_1$, such that lubricant is prevented from venting from the housing 12 and instead flows out the lubricant outlet passage 22 to the delivery line 5. As such, the housing 12 preferably further includes an actuator chamber 52, which is spaced axially from and connected with the vent chamber 26 and sized to receive the valve actuator 50. Specifically, the actuator chamber 52 is preferably provided by a circular cylindrical body 54 attached to or integral with the monobloc 40 and having a circular cylindrical interior bore 55 connected with the vent chamber 26 and defining the chamber 52.

Figure 3:
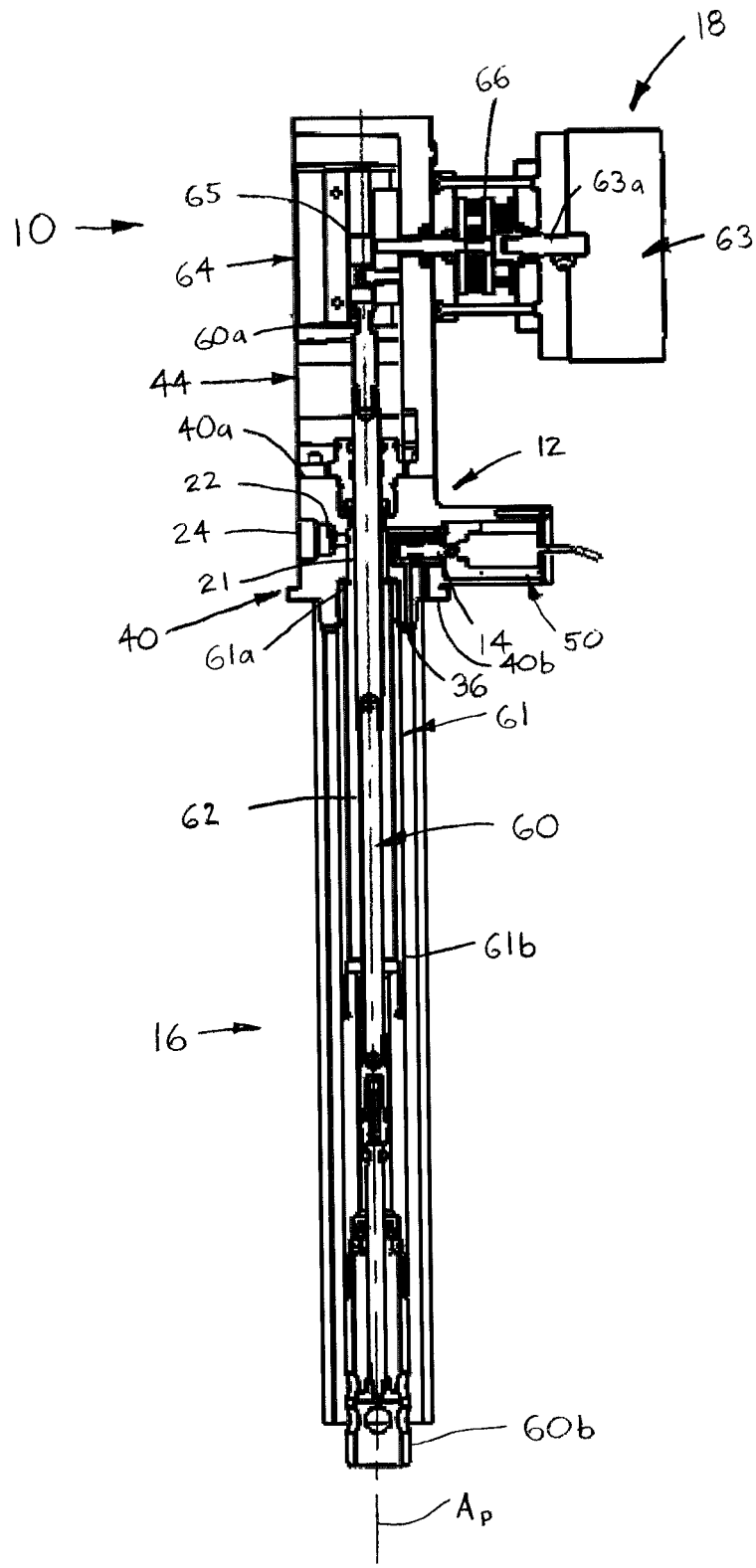
FIG. 3 is another cross-sectional view of the pump.
Figure 4:
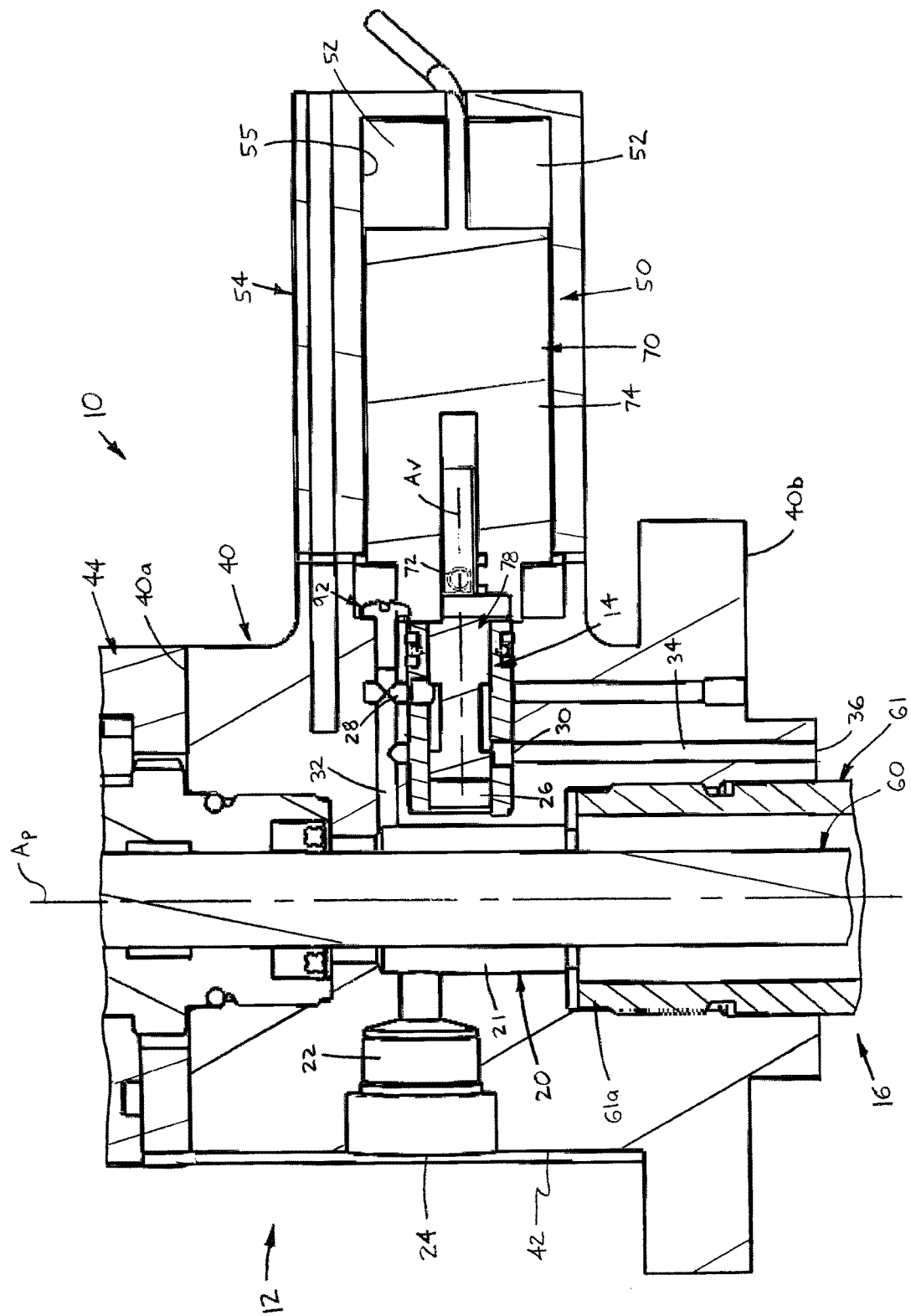
FIG. 4 is a broken-away, enlarged cross-sectional view of the pump in accordance with a first construction.
Figure 5:
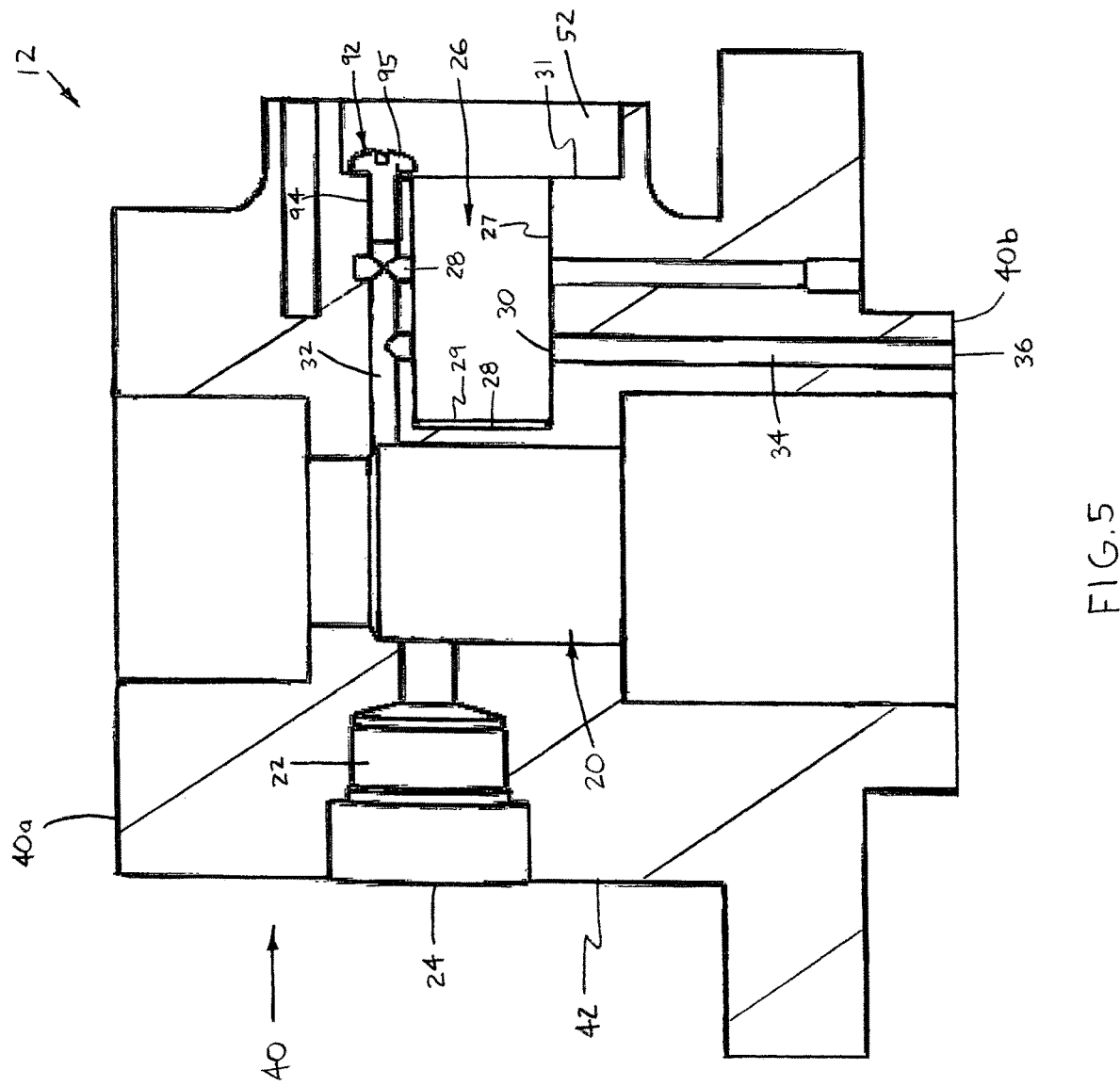
FIG. 5 is an enlarged, axial cross-sectional view of the housing of FIG. 4.

Referring now to FIGS. 2 and 3, although the present invention is primarily concerned with the structure of the housing 12 and the internal vent structure thereof, such that a detailed description of the pump actuator components are beyond the scope of the present disclosure, certain structural features are necessary to provide context to the details of the novel pump 10. The pumping element 16 preferably includes a displaceable ram assembly 60 disposed within a fixed sleeve assembly 61. The ram assembly 60 is generally elongated, extends through the housing central bore 20, and has an upper end 60a connected with the pump actuator 18 and a lower end 60b disposed within the container cavity $C_S$. The sleeve assembly 61 has an upper end 61a connected with the housing 12 and a lower end 61b disposed within the container 1 and is sized diametrically larger than the pumping element 16. As such, an annular sleeve channel 62 is defined between the ram assembly 60 and the sleeve 61, which is fluidly connected with the flow channel 21 within the housing 12. As the ram assembly 60 reciprocates vertically along the pumping axis $A_P$, the lower end 60b of the ram assembly 60 forces lubricant into the annular sleeve channel 62 and pressurizes the lubricant, such that the lubricant is displaced upwardly into the housing channel 21 and thereafter to the lubricant outlet passage 22 (or to the vent inlet passage 32).

To reciprocate the ram assembly 60 of the pumping element 16, the pump actuator 18 preferably includes a motor 63 and a rotational-to-linear mechanism 64, preferably a scotch yoke 65, as best shown in FIG. 2. The mechanism 64 is connected with the upper end 60a of the ram assembly 60 and converts rotation of the motor output shaft 63a, through a gear train 66, to linear displacement of the ram assembly 60 along the pumping axis $A_P$. The motor 63 is an electric motor in certain pump constructions shown in FIGS. 1-12, or is a fluid motor (i.e., hydraulic or pneumatic) in other pump constructions shown in FIGS. 13-17, each pump construction being described below. Although the basic structure is preferably generally as described above, the pumping element 16 and the pump actuator 18 may be constructed in any appropriate manner.

Referring now to FIGS. 4-12, for constructions in which the pump actuator 18 includes an electric motor 63, the valve actuator 50 is preferably a solenoid 70 electrically connected with the motor 63 and includes a linearly displaceable armature or output shaft 72 attached to the valve element 14. The solenoid 70 is configured to displace the valve element 14 toward the first position $P_1$, by extension of the solenoid shaft 72 with respect to the solenoid body 74, when the motor 63 drives the pump actuator 18, such that the valve element 14 obstructs the chamber inlet 28 or/and the chamber outlet 30. Thus, while the electric motor 63 is driving the pumping element 16, the valve element 14 prevents venting of the lubricant, such that substantially all of the lubricant entering the flow channel 21 passes through the lubricant outlet passage 22 and thereafter to the lubricant distributor (s) 2. However, when the motor 63 stops driving the pump actuator 18, the solenoid 70 is disconnected from electric power, causing the solenoid shaft 72 to retract and displace the valve element 14 to the second position $P_2$. As such, lubricant within the housing 12 is vented through the vent inlet passage 32, the vent chamber 26, the vent outlet passage 34 and back into the container 1.

Figure 12:
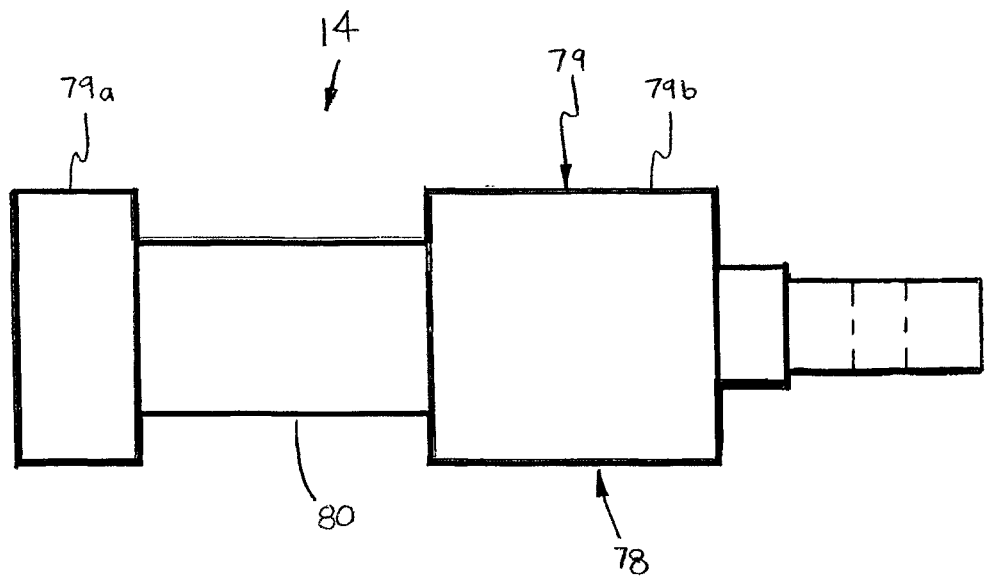
FIG. 12 is a side plan view of the valve element of the pump first construction.

Referring to FIGS. 5-12, with the solenoid valve actuator 70, the vent chamber 26 is preferably defined by an inner cylindrical surface 27 and a radial end surface 29, with the chamber inlet 28 and the chamber outlet 30 being spaced axially apart and each extending through the cylindrical surface 27. Also, the lubricant pump 10 preferably further comprises a tubular sleeve 76 disposed within the vent chamber 26 for receiving a preferred valve element 14. The valve element 14 preferably includes a cylindrical body 78 having an outer circumferential surface 79 and an annular channel 80 extending radially inwardly from the outer surface 79 so as to define first and second outer surface sections 79a, 79b, as indicated in FIG. 12. At least one of the first and second outer surface sections 79a, 79b obstruct at least one of the vent chamber inlet 28 and the vent chamber outlet 30, respectively, when the cylindrical body 78 is located at the valve first position $P_1$. Further, the channel 80 fluidly connects the chamber inlet 28 and the chamber outlet 30 when the valve body 78 is disposed in the valve element second position $P_2$.

Further, the sleeve 76 has opposing first and second axial ends 76a, 76b, an outer circumferential surface 81A disposed within and against the chamber side surface 27 and an opposing inner circumferential surface 81B defining a central bore 82 sized to receive the valve cylindrical body 78.

The sleeve 76 further has first and second ports 84, 86 extending radially between the outer and inner surfaces 81A, 81B and being spaced axially apart. The first port 84 is located to fluidly connect the chamber inlet 28 with the sleeve bore 82 and the second port 86 is located to fluidly connect the chamber outlet 30 with the bore 82.

Preferably, the inner circumferential surface 81B of the sleeve 76 is formed having a surface roughness (Ra) of less than twelve microns (12μ), with the surface sections 79a, 79b of the valve body 78 being similarly formed or finished, such as by grinding, polishing, etc. As such, friction between the valve body 78 and the sleeve 76 is substantially minimized, thereby reducing the pulling force required of the solenoid 70 to displace the valve element 14 to the first position $P_1$. As a result, the required size of the solenoid 70 may be correspondingly minimized.

Referring now to FIGS. 5-11, the housing 12 preferably further includes a slotted opening 88 and the sleeve 76 has at least one projection 90 disposable within the slotted opening 88 to align the first port 84 with the chamber inlet 28 and the second port 86 with the chamber outlet 30. That is, the projection(s) 90 are located on the sleeve 76 relative to the ports 84, 86 and relative to the slotted opening 88 such that engagement of the projection(s) 90 in slotted opening 88 properly orients the ports 84, 86 with the chamber openings 28, 30. Preferably, the slotted opening 88 extends vertically in the chamber radial end surface 29 and the sleeve 76 includes two projections 90 extending axially from the sleeve first axial end 76a. However, the opening 88 and projections 90 may be otherwise located and formed, for example, an axially-extending slotted opening (not shown) in the chamber inner surface and a single axial projection (not shown) extending radially-outwardly from the sleeve outer surface 81A.

Furthermore, the sleeve 76 is preferably sized such that the sleeve outer circumferential surface 81A engages the chamber inner circumferential surface 27 with a location fit, such that the sleeve 76 is readily removable from the chamber 26 for reasons discussed below. Therefore, to maintain the sleeve 76 disposed within the vent chamber 26, the lubricant pump 10 preferably further comprises a retainer 92 releasably engaged with the sleeve 76, preferably against the sleeve second axial end 76b. The retainer 92 is preferably formed as a threaded fastener 94 extending into a radial surface 31 about the chamber outer end and having a head 95 disposable against the second axial end 76b of the sleeve 76. However, the retainer 92 may alternatively be formed in any other appropriate manner to releasably retain the sleeve 76 within the vent chamber 26.

Referring now to FIGS. 13-17, for constructions of the pump 10 in which the pump actuator 18 includes a fluid motor 63, the valve actuator 50 preferably includes a piston 100 connected with the valve element 14 and disposed within the actuator chamber 52. The chamber 52 provides a piston chamber 102 fluidly connected with a pressurized fluid supply for the motor 63, i.e., hydraulic fluid or compressed air, or directly with the motor 63, in either case through a fluid supply hose 68 (FIG. 17), as described below. With this structure, pressurized working fluid is directed into the piston chamber 102 when the fluid motor 63 is operating, such that the piston 100 biases the valve element 14 toward the first position $P_1$, and thus preventing lubricant flow through the vent chamber 26.

More specifically, the vent chamber 26 is preferably defined by a cylindrical inner surface 27 having inner and outer axial ends 27a, 27b (FIG. 15), respectively, and a radial end surface 29 at the surface inner end 27a. The chamber inlet 28 extends through the vent chamber end surface 29 and the chamber outlet 30 is spaced axially from the inlet 28 and extends through the cylindrical surface 27. The piston chamber 102 is preferably defined by a cylindrical inner surface 103 having inner and outer axial ends 103a, 103b, which is spaced axially and radially outwardly from the vent inner surface 27, and an inner end surface 104 extending radially between the inner end 103a of the piston chamber 102 and the outer axial end 27a of the vent inner surface 27. As such, the piston chamber 102 is essentially formed as a counterbore of the vent chamber 26. Further, the piston chamber 102 is enclosed by an endcap 105 attached to the cylindrical body 54 and having a central port 105a configured to receive an end of the fluid supply hose 68, such that the hose 68 provides fluid for operating the piston 100, as depicted in FIG. 17.

Figure 13:
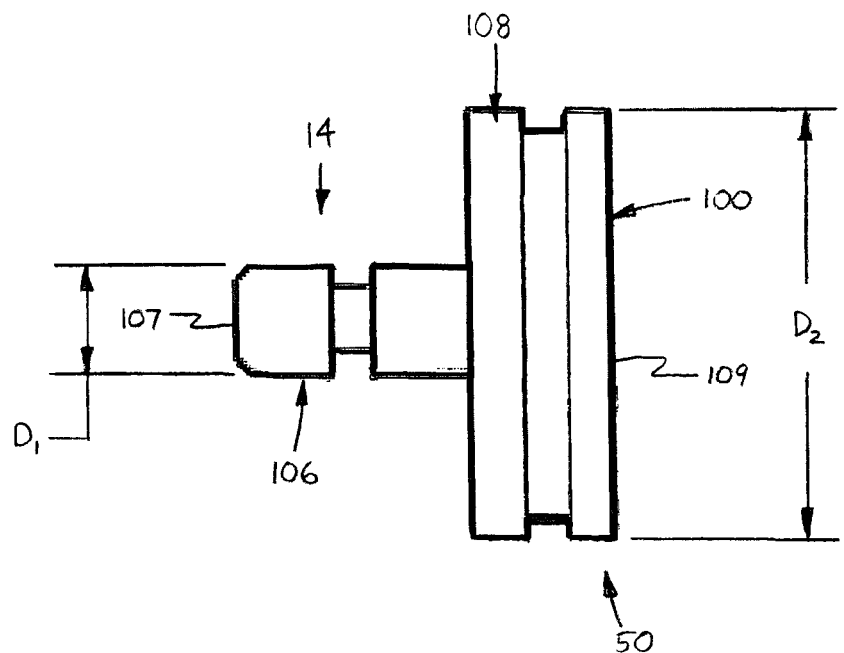
FIG. 13 is a side plan view of a valve element and a valve actuator for a pump in accordance with a second construction of the pump.
Figure 14:
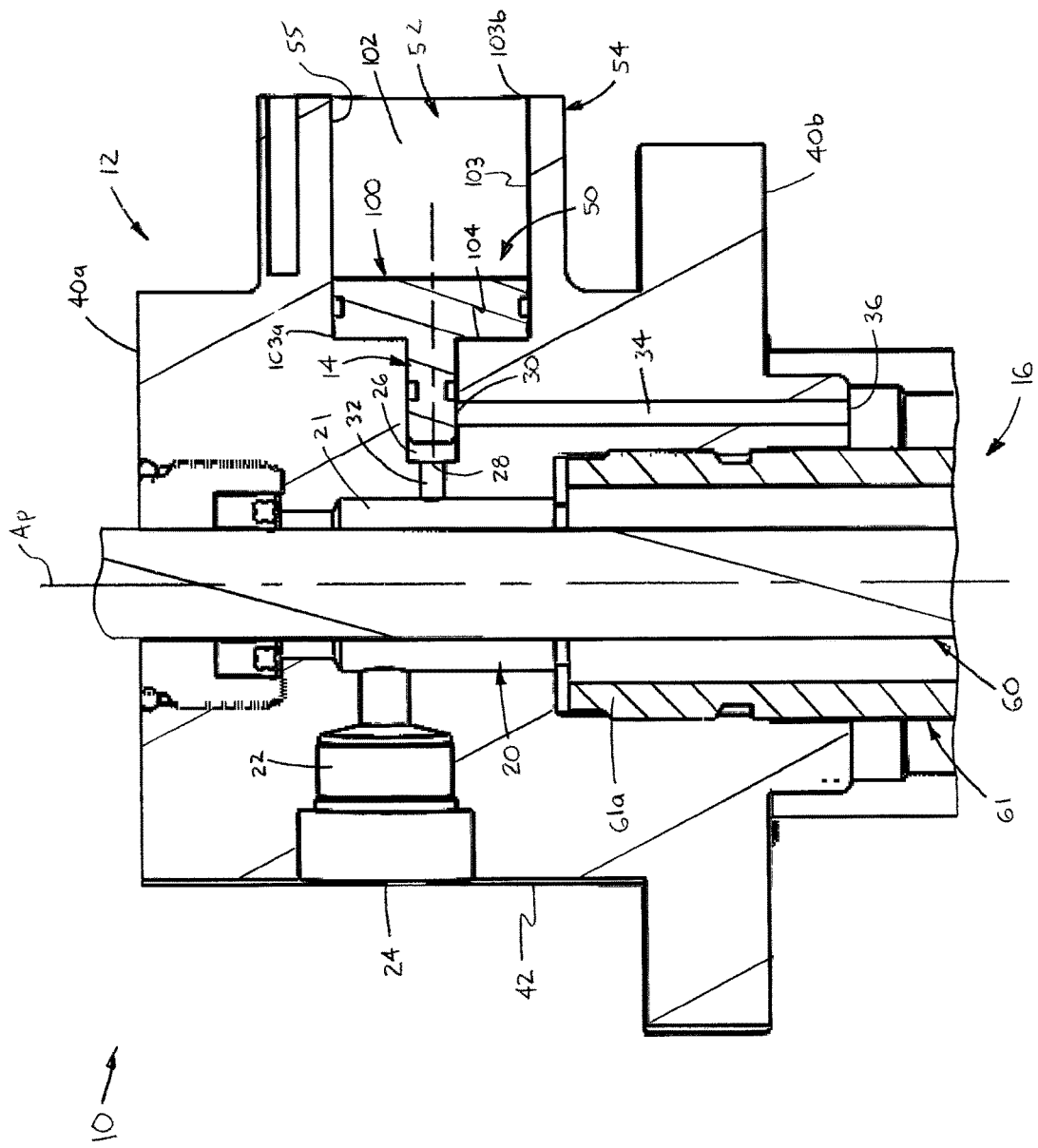
FIG. 14 is a broken-away, enlarged cross-sectional view of the pump in accordance with the second construction.
Figure 15:
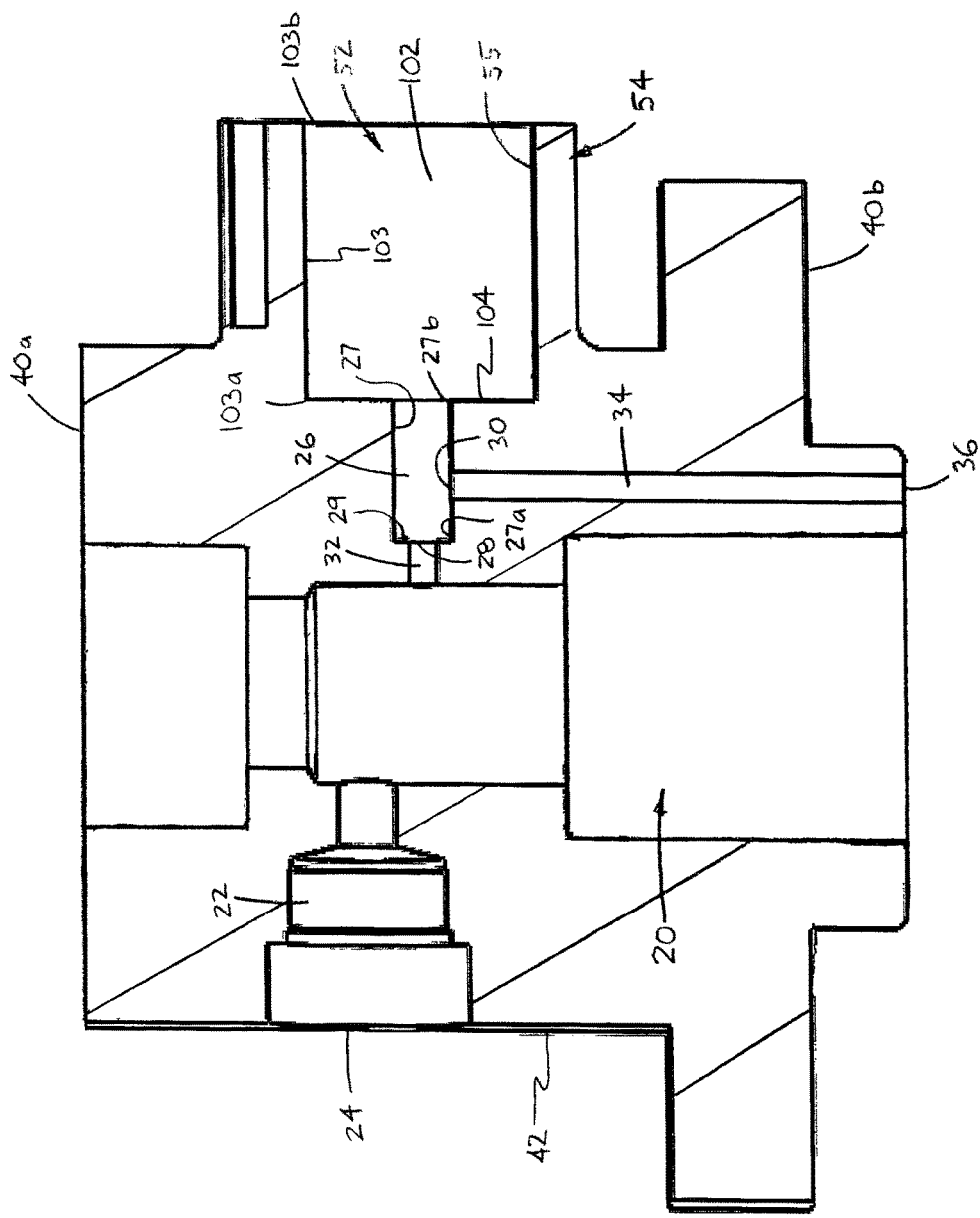
FIG. 15 is an enlarged, axial cross-sectional view of the housing of FIG. 14.

Further, as indicated in FIG. 13, the valve element 14 includes a circular cylindrical body 106 having a first diameter $D_1$ and the piston includes a circular cylindrical body 108 connected with the body 106 and having a second diameter $D_2$ substantially greater than the first diameter $D_1$. The valve element body 106 has a radial end surface 107 exposable to fluid in the vent chamber 26 and the piston body 108 has a radial end surface 109 exposable to fluid within the piston chamber 102. Preferably, the valve body 106 and the piston body 108 are integrally formed as one-piece construction, but may alternatively be formed as two or more connected pieces.

With the above structure, when pressure in the vent chamber 26 and the piston chamber 102 is generally equal, the valve element 14 will remain located or disposed at the valve first position $P_1$ due to the substantially greater surface area of the piston end surface 109 in comparison with the surface area of the valve end surface 107. However, when the fluid motor 63 ceases operating, the pressure within the piston chamber 102 decreases while the pressure in the vent chamber 26 remains at the maximum fluid pressure generated by the pumping element 16. At some point, the pressure within the piston chamber 102 decreases until fluid pressure on the valve element end surface 107 exceeds fluid pressure on the piston end surface 109 by a predetermined magnitude. At this point, the valve element 14 is biased toward the second position $P_2$, such that the vent chamber inlet 28 is fluidly connected with the vent chamber outlet 30. Thereafter, fluid within the lubricant channel 21 passes through the vent inlet passage 32, the vent chamber 26, the vent outlet passage 34 and back into the container cavity $C_S$.

Figure 18:
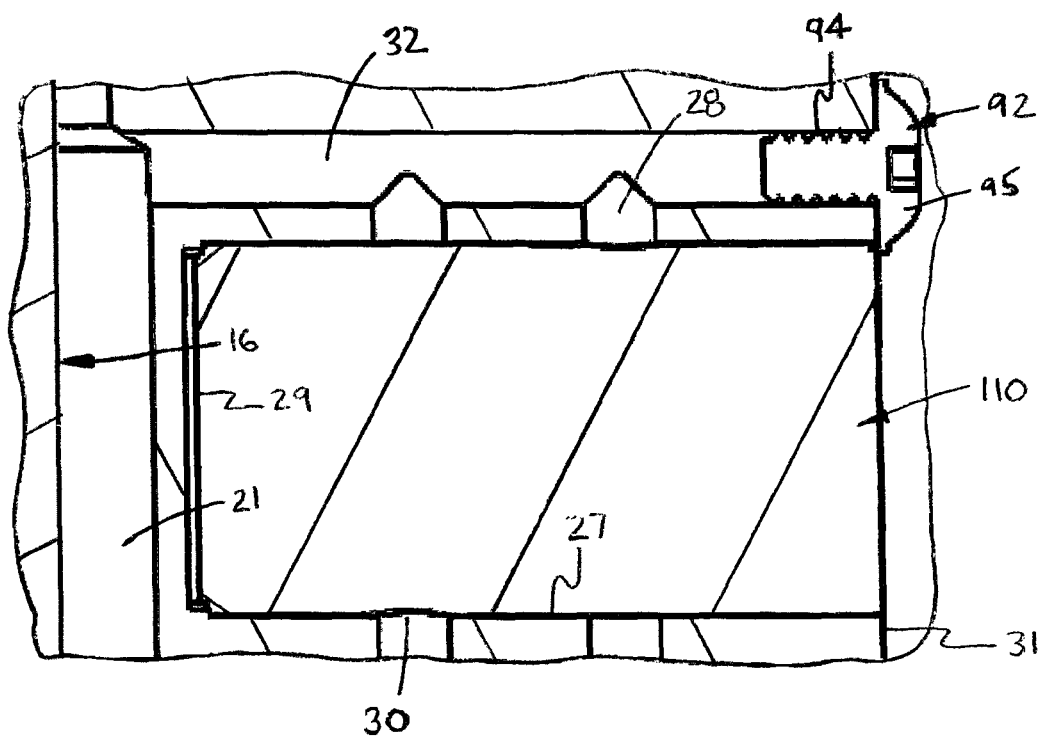
FIG. 18 is a broken-away, more enlarged view of a portion of the pump shown in FIG. 4, showing a valve element and valve actuator removed and replaced with an alternative plug.

Referring to FIG. 18, with either construction, the vent chamber 26 is preferably configured to receive a plug 110 to prevent flow between the vent chamber inlet 28 and the vent chamber outlet 30, as depicted for the first pump construction. Thereby, the pump 10 will not vent to the container 1 and can be used in applications in which it is desired to pump all of the lubricant from the container 1 or from another type of container, as opposed to supplying lubricant to a delivery system 2 that requires periodic resetting of delivery devices (e.g., lubricant injectors 3) and thus also venting.

The pump 10 of the present invention has a number of advantages over known lubricant pumps used for delivering grease. Known grease pumps typically include a separate vent valve that is attached to the pump outlet and normally passes grease through to the distributor and injectors, and otherwise directs grease back to the reservoir through a separate hose. The present pump 10 eliminates the requirement for the external valve and the hose for directing lubricant/grease back to the reservoir. By having the valve element 14 enclosed within the housing 12, the valve element 14 is protected from dirt and moisture and the potential for impact damage as would be the case with an externally mounted valve. Further, the valve element 14 may be readily removed from the vent chamber 16 and replaced with the plug 110 to convert the pump 10 for non-venting applications.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A lubricant pump for driving lubricant from a container to at least one lubricant distributor, the container having upper and lower ends and an interior storage cavity for retaining a quantity of lubricant, the pump comprising:

a housing mountable to the upper end of the container and having a vertically-extending, central bore, an outlet passage extending between the central bore and an outlet port fluidly connectable with the lubricant distributor, a vent chamber having an inlet and an outlet, a vent inlet passage extending between the central bore and the vent chamber inlet, and a vent outlet passage extending between the vent chamber outlet and a vent outlet port fluidly connectable with the container cavity; and a movable valve element disposed within the vent chamber and displaceable along an axis between a first position in which the valve element obstructs at least one of the chamber inlet and the chamber outlet and a second position in which the chamber inlet is fluidly connected with the chamber outlet to provide an internal flow path from the central bore to the vent outlet port;

wherein the housing includes a monobloc providing the central bore, the outlet passage, the vent chamber, the vent inlet passage, and the vent outlet passage.

2. The lubricant pump as recited in claim 1 further comprising:

an elongated, vertically-extending pumping element having upper and lower ends and being disposed within the central bore such that an annular flow channel is defined between the pumping element and the central bore, the outlet passage and the vent inlet passage each being fluidly connected with the flow channel, the lower end of the pumping element being disposable within the container cavity;

an actuator connected with or disposed within the housing and configured to reciprocally linearly displace the pumping element along a vertical axis such that the pumping element drives lubricant from the container cavity and into the flow channel.

3. The lubricant pump as recited in claim 1 wherein the monobloc has upper and lower ends and at least one side surface, the lower end being connectable with the container, the central bore extending between and through the upper and lower ends, the outlet port extending through the side surface and the vent outlet port extending through the lower end.

4. The lubricant pump as recited in claim 1 wherein:
the vent chamber inlet is spaced axially from the vent chamber outlet; and
the valve element includes a cylindrical body having an outer circumferential surface, an annular channel extending radially inwardly from the outer surface so as to define first and second outer surface sections, at least one of the first and second outer surface sections obstructing at least one of the vent chamber inlet and the vent chamber outlet when the cylindrical body is disposed in the valve element first position, the channel fluidly connecting the chamber inlet and the chamber outlet when the cylindrical body is disposed in the valve element second position.

5. The lubricant pump as recited in claim 1 further comprising a valve actuator configured to bias the valve element toward the first position.

6. The lubricant pump as recited in claim 5 wherein the housing further has an actuator chamber spaced axially from and connected with the vent chamber and sized to receive the actuator.

7. The lubricant pump as recited in claim 5 wherein:
the pump further comprises an elongated pumping element extending through the housing central bore and a pump actuator configured to reciprocally linearly displace the pumping element along a vertical axis, the actuator including an electric motor; and
the valve actuator is a solenoid electrically connected with the motor and configured to displace the valve element toward the first position when the motor drives the pump actuator.

8. The lubricant pump as recited in claim 7 further comprising a tubular sleeve disposed within the vent chamber and including a central bore sized to receive the valve element, a first port fluidly connecting the chamber inlet with the sleeve bore and a second port fluidly connecting the chamber outlet with the sleeve bore.

9. The lubricant pump as recited in claim 8 wherein the housing has a slotted opening and the sleeve has a projection disposeable within the slotted opening to align the first port with the chamber inlet and the second port with the chamber outlet.

10. The lubricant pump as recited in claim 8 wherein the vent chamber has an inner circumferential surface, the sleeve has an outer circumferential surface sized to engage the chamber inner circumferential surface with a location fit, and the pump further comprises a retainer releasably engaged with the sleeve to maintain the sleeve disposed within the vent chamber.

11. The lubricant pump as recited in claim 8 wherein the sleeve has an inner circumferential surface, the surface having a surface roughness (Ra) of less than twelve microns (12 μ).

12. The lubricant pump as recited in claim 5 wherein:
the valve actuator includes a piston connected with the valve element; and
the housing further has a piston chamber spaced axially from and connected with the vent chamber, the piston being disposed within the piston chamber.

13. The lubricant pump as recited in claim 12 wherein:
the pump further comprises an elongated pumping element extending through the housing central bore, a pump actuator configured to reciprocally linearly displace the pumping element along a vertical axis, the pump actuator including a fluid motor, and a pressurized fluid supply connected with the motor; and
the piston chamber is fluidly connected with the fluid supply such that fluid is directed into the piston chamber when the fluid motor is operating such that the piston biases the valve element toward the first position.

14. The lubricant pump as recited in claim 12 wherein:
the valve element includes a cylindrical body having a first diameter and a radial end surface exposable to fluid in the vent chamber; and
the piston includes a cylindrical body having a second diameter and a radial end surface exposable to fluid within the piston chamber, the second diameter of the piston body being substantially greater than the first diameter of the valve body.

15. The lubricant pump as recited in claim 14 wherein the valve element is biased toward the second position when fluid pressure on the valve element end surface exceeds fluid pressure on the piston end surface by a predetermined magnitude.

16. The lubricant pump as recited in claim 1 wherein the vent chamber is configured to receive a plug to prevent flow between the vent chamber inlet and the vent chamber outlet.

17. A lubricant pump for driving lubricant from a container to at least one lubricant distributor, the container having upper and lower ends and an interior storage cavity for retaining a quantity of lubricant, the pump comprising:
a housing mountable to the upper end of the container and having a vertically-extending, central bore, an outlet passage extending between the central bore and an outlet port fluidly connectable with the lubricant distributor, a vent chamber having an inlet and an outlet, a vent inlet passage extending between the central bore and the vent chamber inlet, and a vent outlet passage extending between the vent chamber outlet and a vent outlet port fluidly connectable with the container cavity;
a movable valve element disposed within the vent chamber and displaceable along an axis between a first position in which the valve element obstructs at least one of the chamber inlet and the chamber outlet and a second position in which the chamber inlet is fluidly connected with the chamber outlet to provide an internal flow path from the central bore to the vent outlet port; and
a valve actuator configured to bias the valve element toward the first position, the housing further having an actuator chamber spaced axially from and connected with the vent chamber and sized to receive the actuator, the valve actuator being disposed within the actuator chamber.

18. A lubricant pump for driving lubricant from a container to at least one lubricant distributor, the container having upper and lower ends and an interior storage cavity for retaining a quantity of lubricant, the pump comprising:
- a housing mountable to the upper end of the container and having a vertically-extending, central bore, an outlet passage extending between the central bore and an outlet port fluidly connectable with the lubricant distributor, a vent chamber having an inlet and an outlet, a vent inlet passage extending between the central bore and the vent chamber inlet, and a vent outlet passage extending between the vent chamber outlet and a vent outlet port fluidly connectable with the container cavity; and
- a movable valve element disposed within the vent chamber and displaceable along an axis between a first position in which the valve element obstructs at least one of the chamber inlet and the chamber outlet and a second position in which the chamber inlet is fluidly connected with the chamber outlet to provide an internal flow path from the central bore to the vent outlet port;
- wherein the vent chamber is configured to receive a plug to prevent flow between the vent chamber inlet and the vent chamber outlet.

19. A lubricant pump for driving lubricant from a container to at least one lubricant distributor, the container having upper and lower ends and an interior storage cavity for retaining a quantity of lubricant, the pump comprising:
- a housing mountable to the upper end of the container and having a vertically-extending, central bore, an outlet passage extending between an inlet at the central bore and an outlet port fluidly connectable with the lubricant distributor, a vent chamber having an inlet and an outlet, a vent inlet passage extending between an inlet at the central bore and the vent chamber inlet, the inlet of the vent inlet passage being separate from the inlet of the outlet passage such that the vent inlet passage is fluidly distinct from the outlet passage, and a vent outlet passage extending between the vent chamber outlet and a vent outlet port fluidly connectable with the container cavity; and
- a movable valve element disposed within the vent chamber and displaceable along an axis between a first position in which the valve element obstructs at least one of the chamber inlet and the chamber outlet and a second position in which the chamber inlet is fluidly connected with the chamber outlet to provide an internal flow path from the central bore to the vent outlet port.

\* \* \* \* \*